Patented Aug. 23, 1932

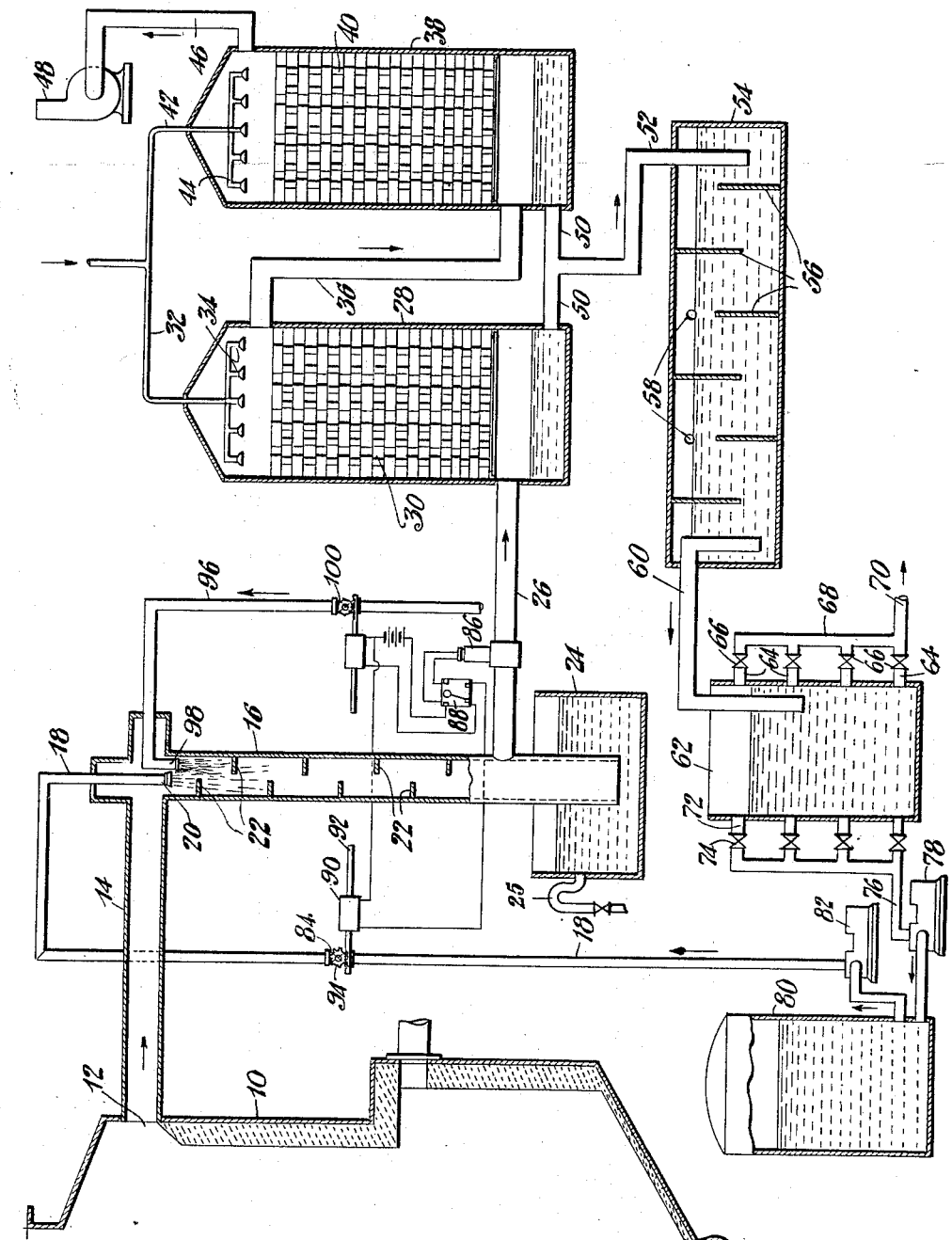

1,872,958

UNITED STATES PATENT OFFICE

ALFRED JOHNSON, OF WESTERLEIGH, NEW YORK, ASSIGNOR TO COMBUSTION UTILITIES CORPORATION, OF NEW YORK, N. Y., A CORPORATION OF MAINE

SELECTIVE SEPARATION OF LIQUIDS

Application filed December 12, 1924. Serial No. 755,379.

This invention relates to the separation of liquid emulsions into their constituents, and more particularly to a method of and apparatus for dehydrating tar-water emulsions or similar aqueous emulsions of fatty or resinous oils.

Great difficulty is often encountered in breaking down liquid emulsions and selectively separating their several constituents. This is particularly true of aqueous emulsions of coke-oven or water-gas tars and petroleum oils. In a tar-water emulsion the water is normally the low boiling and the tar the high boiling constituent of the emulsion. One of the greatest problems a tar distiller has to face is the elimination of water, which is present in proportions ranging from 5% to 50% in almost all tars. Before submitting wet tar to distillation it is desirable and in the case of some tars absolutely necessary to separate water from the tar to prevent foaming and priming in the still, and more generally in order that the distilling plant will not be too cumbersome and expensive in design and in operation. Some tars can be dehydrated by simple settling, but as a rule the water and tar mixture forms an emulsion which cannot be broken down even after long standing. Ordinary methods of distillation are as a rule ineffective for breaking down emulsions. Mechanical disintegrators and centrifugal separators are often employed for dehydrating tar, but the cost of installing these special classes of dehydrators is high, and they are expensive to operate. As a rule they require batch or intermittent charging and discharging, and therefore have a relatively low treating capacity.

The primary object of the present invention is to provide a method and apparatus by means of which liquid emulsions can be continuously and rapidly resolved and the emulsion constituents separated.

With this object in view one feature of the invention contemplates intimately contacting a stream of emulsion with a current of gas carrying superheat with respect to the vapor of its low boiling constituent, so that the gas will selectively vaporize the low boiling constituent without having a substantial vaporizing effect on higher boiling constituents of the emulsion.

Another object of the invention is to provide a simple, effective and economical method of and apparatus for separating water from wet tar or similar aqueous emulsions.

To accomplish this object another feature of the invention contemplates using the hot tar vapor carrying gas removed from a gas generator as a dehydrating agent, and simultaneously making use of the wet tar or other aqueous emulsion which is to be dehydrated as a condensing and scrubbing agent for cooling the gas and scrubbing out its condensible high-boiling constituents.

With these and other objects and features in view, the invention consists in the method of and apparatus for selectively separating the constituents of liquid emulsions hereinafter described and particularly defined in the claims.

The various features of the invention are illustrated in the accompanying drawing, which represents in vertical elevation, partly in section, the arrangement of dehydrating apparatus embodying the preferred form of the invention.

Essentially the preferred dehydrating method consists in contacting a circuit of gas heated to a temperature above the boiling point of water and unsaturated with water vapor at the temperature employed with an atomized emulsion consisting of water and some other fatty or resinous constituent of a highly boiling point, in ascertained ratios by volume and for a period of time such that the sensible heat of the gas will be sufficient to effect a complete separation and vaporization of the water from the emulsion without completing saturation of the gas at the temperatures obtaining at the close of the dehydrating operation. Among the many advantages which may be claimed for this novel procedure are that an aqueous emulsion can be completely and effectively dehydrated without appreciably effecting its higher boiling constituents; that both the new process and the new apparatus are exceedingly simple and may be run continuously or intermittently with equal facility; and that the new process and apparatus can be combined readily with the condensing, scrubbing and tar extracting steps of a tar vapor carrying gas scrubbing operation to materially increase the economy and efficiency of the tar dehydration and also of the gas scrubbing operation.

The arrangement of apparatus illustrated in the drawing shows the application of the invention to the dehydration of a tar-water emulsion when the rich or tar vapor carrying gas taken off from the top of a shaft generator of the type known as the Doherty gas shell is employed as a dehydrating agent. The preferred method of dehydrating tar-water emulsions, as carried out in the apparatus illustrated in the drawing, consists in removing the rich gas evolved from coal or other carbonaceous material during its distillation in the upper portion of a shaft generator or carbonizing shell 10, while at a temperature of about 500° F., through a gas offtake 12, and passing it through a foul gas main 14 into the top of a standpipe 16. At the top of the standpipe or dehydrating shaft 16 a tar-water emulsion is introduced into the current of hot gas, in an atomized form, through a pipe 18 and a spray nozzle 20.

The rich hot unpurified coal distillation gas removed from the top of a generator of the Doherty shaft type, operating with charges of bituminous fuel on a modified water-gas or "hydrogas" process, at 500° F. carries an average of about eight pounds of water and about five pounds of condensible volatile compounds, or tar, per 1000 cubic feet of gas. The dew point for a gas of the above type containing eight pounds of water per 1000 cubic feet is approximately 128° F. Accordingly, every thousand cubic feet of such a gas when superheated to a temperature of 500° F. can be used to evaporate approximately seven pounds of water in cooling from 500° F. to 148° F., which is the approximate dew point of such a gas containing fifteen pounds of water.

In passing downwardly through standpipe 16 the hot rich gas is brought into intimate contact with the downwardly moving tar-water emulsion, which is in an atomized condition or in thin layers by reason of its introduction through spray nozzle 20 and its distribution over baffles 22. As a result of this intimate contact, the gas is cooled by a direct heat transfer with the wet tar emulsion and the sensible heat thus given up by the gas evaporates the water constituent of the emulsion. The dry tar follows down along the side of the standpipe and drains into a dry tar tank 24 from which it may be removed through an off-take pipe 25. The tar collected in tank 24 serves as a gas seal for the standpipe, while the gas, substantially saturated with the water it has picked up in the standpipe 16, passes through main 26 into the base of a standard type of condensing and scrubbing unit 28. As it rises upwardly through filling 30 of this condensing unit, the saturated gas is cooled below its dew point and a large part of its tar and water content condenses and is scrubbed out by intimately contacting it with downwardly moving films of cooling water introduced into the unit through a pipe 32 and spray nozzles 34. From unit 28 the gas is conducted through a conduit 36 into the base of a similar condensing unit 38, where any tar or other condensible liquid remaining in the gas is condensed out or precipitated as the gas rises through filling 40 by direct contact with sprays and films of cooling water introduced through a pipe 42 and nozzles 44. The scrubbed gas is then removed from the top of unit 38 through a main 46 into an exhauster 48 and is preferably passed through light oil scrubbing and purifying equipment and thence into storage holders or service mains (not shown).

The tar and water condensed and scrubbed out of the gas in the units 28 and 38, together with any emulsion formed or deposited therein, is passed through pipes 50 and drawoff pipe 52 into one end of a tar separator 54. The liquid mixture is directed by vertical baffles 56 to follow a zigzag path as it flows from one end of tank 54 to the other, and any water or ammonia liquor which separates from the tar is drawn off through outlets 58. From the other end of tank 54 the wet tar is drawn through a syphon 60 into a tar decanting tank 62, from which as much water as it is possible to separate from the tar by gravity settling during the short period of time available is removed through drawoff pipes 64 and valves 66 into a vertical extension 68 of ammonia liquor main 70. The semi-dry tar is then removed from the tank 62 through pipes 72 and valves 74 into main 76, and is forced by pump 78 into the base of tank 80. From tank 80 the semi-dry tar is forced by pump 82 through the feed pipe 18 and spray nozzles 20 into the top of the stand-pipe 16.

A valve 84 in feed pipe 18 is preferably actuated automatically by some form of temperature regulator such as that indicated diagrammatically in the drawing. The type of regulator used is optional so long as it performs the function required of it. The type of regulator illustrated in the drawing comprises essentially a thermostat 86 placed in the gas conduit 26 and arranged to close or open a switch 88, by which an electric circuit is in turn opened or closed and a solenoid 90 is excited to draw a rack plunger 92 back and forth through its core. The thermostat 86 is usually set to operate within slight temperature changes; that is, whenever the temperature of the gas passing through line 26 is lowered or raised, if only to a slight degree, such variation will be sufficient to set the regulator in motion. The teeth of plunger 92 engage the teeth of a pinion 94 on the stem of the valve 84 and the movement of the plunger opens or closes the valve. The chief purpose of this temperature regulator is to so control the rate of flow of semi-dry tar to the standpipe through pipe 18 that the gas passing to the condensing system from the base of the standpipe may have the proper temperature for holding all the water evaporated from the tar in the vapor state.

The temperature of gas passing to the condensing system through conduit 26 must be kept above the dew point if it is desired to collect only dry tar in tank 24. Accordingly, the volume of the semi-dry tar sprayed into the gas stream at the top of the standpipe should preferably be kept low enough so that its water content can all be evaporated by the heat of the gas without lowering the temperature of the gas below the dew point. For economical operation, however, it is also important that the gas leave the base of the standpipe without any considerable degree of superheat. If the gas is allowed to leave with considerable superheat light hydrocarbons may be evaporated from the tar and carried on into the condensing system. The water content in the semi-dry tar or the volume of tar to be treated, may not always be sufficient to lower the temperature of the gas the desired amount during its passage through the standpipe. Accordingly, as an additional means of controlling the temperature of gas leaving the standpipe through conduit 26, a water circuit is provided comprising an intake pipe 96 leading to a spray nozzle 98 in the top of standpipe 16. A valve 100 in the water intake pipe is actuated automatically by the same temperature regulating device which actuates valve 84 in the semi-dry tar feed line. By opening or closing valve 100 regulated amounts of water can be added to the gas at the top of the standpipe to make up any deficiencies in the volume of water carried by the semi-dry tar, so that the gas will always enter the condensing system approximately saturated with water vapor and at a uniform temperature which is only slightly above its dew point.

In its downward passage through the standpipe 16 the rich gas dehydrating medium drops most of its dust content, and as its temperature is lowered, quite a large proportion of the high boiling hydrocarbons which it carries condense in the form of tiny globules or "tar mist" and are scrubbed out by the tar undergoing dehydration. Thus one of the chief advantages of the invention is that while the dehydration is taking place the tar undergoing dehydration is used simultaneously as a scrubbing and condensing agent for removing dust and high boiling condensible hydrocarbons from the gas dehydrating medium, in the form of substantially dry tar.

Another advantage of the invention is that the present method of dehydrating water-tar emulsions can be carried on simultaneously with a gas condensing and tar scrubbing operation, within the confines of a single set of apparatus units which are extremely simple and inexpensive both in design and operation, thus reducing materially both the cost of dehydrating the emulsions and the cost of preparing the gas for industrial or domestic use.

The method and apparatus described and illustrated in the drawing is not limited to the treatment of aqueous coal-tar emulsions, but may be applied with slight modification in design to the dehydration of many other kinds of aqueous emulsions. Thus the same procedure may be applied, using substantially the apparatus illustrated, to the dehydration of water-gas tar emulsions with water-gas, as by circulating the emulsion through the water seal box and/or through the entrance pipe to the seal. The gas dehydrating medium which is employed need not be a rich coal gas such as that removed from a Doherty carbonizing shaft operating on a modified water gas or "hydrogas" process. The principal reason for choosing such a gas in describing the preferred form of the invention was to illustrate how a gas which is already partially saturated with water vapor and condensible hydrocarbons can be used as a dehydrating agent while being simultaneously condensed and partially scrubbed by a previously condensed semi-dry coal tar. A clean, dry gas would of course be far more effective as a dehydrating agent, but in using such a gas the cost of preheating needs as a rule to be considered. It has been found that in operating Doherty gas shells, for instance, the temperature of rich gas leaving the top of the shell cannot be reduced much below 500° F., so that by using such a gas as a dehydrating agent the expense involved in preheating the gas dehydrating agent is not only avoided but a major part of the heat which would otherwise be lost from the gas making operation in the form of sensible heat carried out by the rich gases is by this means recovered and utilized, thus raising the thermal efficiency of the combined gas making, gas scrubbing and tar dehydrating operations.

One feature of the invention is that the gas and emulsion are passed in the same direction through the dephlegmating shaft. The advantage of thus passing the gas and emulsion in parallel is that the temperature of the gas as it enters and leaves the shaft can always be maintained below the boiling point of the high-boiling constituent of the emulsion without materially impairing its selective vaporizing action on the low boiling constituent.

The type of temperature control employed is optional, as previously stated, and is not limited to the particular type illustrated diagrammatically in the drawing. This temperature control feature may be advantageously extended so as to permit a certain percentage of the light hydrocarbon constituents of the tar to be carried off with the gas into the condensing system, if desired.

The new apparatus is extremely simple and consumes relatively little time, power or heat in operation. Every unit volume, or 1000 cu. ft. of a partially saturated fuel gas of the class described, for example, containing say eight pounds of water and five pounds of tar, when contacted with a stream of water-tar emulsion at a temperature of 500°, assuming the emulsion to be at 60° F., is capable of dehydrating about sixteen pounds of tar from an emulsion containing 30% water, in cooling to a temperature of 148° F. Accordingly, in an operation in which the whole supply of wet tar to be dehydrated is originally obtained from the dehydrating gas current itself, it is apparent that the dehydrator need be in operation less than one-third of the time. This operating period is further shortened due to the fact that a part of the tar carried by the gas is always condensed out and precipitated in the form of dry tar within the standpipe of the dehydrating unit itself.

The speed at which exhauster 48 is operated controls the rate at which the tar vapor carrying fuel gas is drawn through the dehydrating unit 16 and through condensing and scrubbing units 28 and 38, and the period during which gas and emulsion are contacted in the shaft 16 is therefore controlled by the exhauster. The volume ratio and temperature differential between gas and wet tar entering the standpipe 16 are preferably maintained high enough so that the current of gas will give up sufficient sensible heat during its passage through the standpipe to evaporate all the low-boiling constituent, e. g. water, from the tar-water emulsion without at the same time becoming saturated therewith. However, if at any time the volume ratio between gas and tar, or the temperature differential between in-going gas and wet tar, respectively, fall below those preferred for complete dehydration conditions, the apparatus may be preferably so arranged that any tar which is not dehydrated in the first treatment can be re-circulated through the dehydrating unit in direct contact with a fresh current of dry or partially dry hot gas. For this purpose the same single unit 16 may be used, or two or more of such units may be arranged in series, in parallel, or in any other convenient way in which they can be connected up to carry out most effectively and economically the complete dehydration of a given tar and/or the simultaneous condensation and partial purification of a particular gas dehydrating agent.

The new and useful method and apparatus above described is not limited to the dehydration of aqueous emulsions, but may be applied with only slight modifications to the treatment of almost any non-aqueous liquid emulsion with almost any superheated gas which will serve selectively to evaporate one constituent of the emulsion in preference to other higher boiling constituents.

In the specification and claims the medium employed for breaking down the emulsion and causing selective separation of its constituents has been described as a "gas containing superheat with respect to the vapor of the low-boiling constituent." This phrase is employed generically to describe a gas heated to a temperature above the boiling point of the low-boiling constituent of the emulsion and unsaturated with respect to the vapor of said low-boiling constituent.

The preferred form of the invention having been thus described what is claimed as new is:

1. A method of dehydrating aqueous emulsions which comprises atomizing a regulated volume of the emulsion into a current of gas containing superheat with respect to water vapor, dispersing the emulsion through the hot gas and passing both downwardly through a dehydrating shaft in direct heat transferring relationship to evaporate water from the emulsion, removing moist gas and dry constituents of the emulsion separately from the base of the shaft, and maintaining the temperature of the gas leaving the base of the shaft above its dewpoint.

2. A method of dehydrating aqueous emulsions which comprises atomizing a regulated volume of the emulsion into a current of gas containing superheat with respect to water vapor, dispersing the emulsion through the gas to evaporate water therefrom and to simultaneously cool and purify the gas by scrubbing out its condensible components, subsequently separating the dry constituents of the emulsion from the moist gas, periodically introducing additional water into the gas to maintain the temperature of the separated moist gas slightly above its dewpoint, and governing the rate at which emulsion and water are introduced into the gas according to the temperature of the separated moist gas.

3. A method of dehydrating tar which comprises atomizing a regulated volume of wet tar into a current of hot dry fuel gas, passing the atomized tar and gas through a dehydrating shaft in intimate heat transferring relationship to evaporate water from the tar and simultaneously to condense and scrub out high boiling hydrocarbons from the gas, collecting dry tar at the base of the shaft and removing moist gas separately from the shaft at a temperature slightly above its dewpoint, controlling the temperature of the out-going gas, and governing the rate at which tar is introduced into the shaft according to the temperature of the out-going gas.

4. A method of dehydrating tar which comprises introducing regulated portions of hot semi-dry gas and of cool wet tar into the top of a vertical shaft, passing the gas and tar downwardly through the shaft in direct heat transferring relationship, utilizing the cool tar to condense and scrub out high boiling hydrocarbons from the gas and simultaneously utilizing the hot semi-dry gas to separate and evaporate water from the tar, collecting dry tar at the base of the shaft and condensing wet tar from the moist gas after it leaves the shaft, regulating the rate at which said wet tar is introduced into the shaft in accordance with the temperature of the gas leaving the base of the shaft, and maintaining the temperature of the gas leaving the base of the shaft slightly above its dewpoint.

5. A method of dehydrating tar which comprises introducing regulated volumes of unscrubbed fuel gas containing superheat with respect to water vapor, and of wet tar, simultaneously into the top of a vertical dehydrating shaft, passing the gas and tar through the shaft to dry the tar and cool and scrub out condensible hydrocarbons from the gas, removing substantially moisture-saturated gas from the bottom of the shaft at a temperature above its dewpoint, subsequently cooling the gas below its dewpoint and scrubbing out most of its remaining condensible contents, in the form of wet tar, collecting and partially drying said wet tar, introducing the semi-dry tar thus obtained into the top of the dehydrating shaft in admixture with fresh volumes of superheated fuel gas, and thereby drying said tar and condensing and scrubbing condensible hydrocarbons from said gas.

6. An apparatus for separating liquid emulsions into their constituents comprising a vertical standpipe having a closed top and an open base with baffles making a tortuous passage therethrough, separate means connecting the top of the standpipe with sources of supply of liquid emulsion and hot gas, means for bringing the gas and emulsion into intimate heat transferring relationship in the body of the standpipe, a seal pot or trap for collecting the non-volatilized constituents of the emulsion at the base of the standpipe, and an offtake leading off from the standpipe immediately above said seal pot for carrying off cooled gas and volatilized constituents of the emulsion therefrom.

7. An apparatus for selectively separating liquid emulsions into their high- and low-boiling constituents comprising a vertical standpipe, a main connecting the top of the standpipe with baffles making a tortuous passage therethrough to a source of supply of gas containing superheat with respect to the low boiling constituent of the emulsion, a supply pipe connecting the top of the standpipe with a source of supply of emulsion, said pipe having attached thereto a device for introducing emulsion in an atomized form into the standpipe, means for dispersing the emulsion through a current of the hot gas flowing downwardly through the standpipe to effect an efficient heat-transfer between gas and emulsion and vaporization of the low boiling constituent of the emulsion, a seal pot at the base of the standpipe for collecting high boiling non-volatilized constituents of the emulsion, and a draw-off conduit leading off from the base of the standpipe above said seal pot for removing gas and vaporized low-boiling constituent from the standpipe separately from the high boiling constituent.

8. An apparatus for dehydrating aqueous emulsions comprising a vertical standpipe, means for introducing superheated dry gas into the top of the standpipe, means for simultaneously atomizing a regulated volume of aqueous emulsion into the top of the standpipe, means for passing the gas and emulsion downwardly through the standpipe, means for thoroughly dispersing the emulsion through the downwardly moving gas-stream to insure an efficient transfer of heat and vaporization of water from the emulsion, means for removing gas and water vapor from the base of the standpipe separately from the dry higher boiling constituents of the emulsion, and means for governing the rate at which emulsion is introduced into the standpipe according to the temperature of the moist gas leaving the base of the standpipe.

9. An apparatus for dehydrating aqueous emulsions comprising a dehydrating shaft, means for introducing a current of gas containing superheat with respect to water vapor into the top of the shaft, means for atomizing a regulated volume of aqueous emulsion into the gas at the top of the shaft, means for intimately contacting the gas and emulsion during their downward passage through the shaft, means at the base of the shaft for collecting dry constituents of the emulsion, means for removing gas and water evaporated from the emulsion separately from said water-free constituents, and means for controlling the rate at which emulsion is introduced into the shaft to maintain the temperature of the out-going moist gas slightly above its dew-point.

10. An apparatus for dehydrating tar comprising a vertical standpipe, a foul gas main connecting the top of the standpipe with a gas generator, a conduit connecting the lower portion of the standpipe with a gas condensing and tar-scrubbing unit, means for atomizing wet tar precipitated from the gas in the condensing and scrubbing unit into a current of hot dry gas from the generator at the top of the standpipe, a dry tar trap at the base of the standpipe, means controlling the rate at which tar is fed into the standpipe, said controlling means being governed according to the temperature of the moist gas leaving the standpipe.

11. An apparatus for separating aqueous emulsions into water and higher boiling constituents comprising a shaft having an inlet for cool emulsion and an inlet for superheated gas at its top and separate outlets near its base for high boiling constituents of the emulsion and for the gas and water vapors, means for condensing the water vapors from the gas, means for periodically introducing water into the top of the shaft and means governed by the temperature of the outgoing gas for controlling the rate at which emulsion and water is introduced into the shaft.

12. An apparatus for dehydrating tar comprising a gas generator, a tar dehydrating and gas-condensing shaft and a gas condensing and scrubbing unit, means for conducting a current of hot semi-dry gas from the generator through said shaft and thence through the condensing and scrubbing unit, means for collecting wet tar precipitated from the gas in said condensing and scrubbing unit, means for introducing wet tar from said collecting means through an atomizer into the current of gas entering the shaft, means for collecting tar dehydrated by said gas and tar condensed from said gas within the shaft, and means governed by the temperature of the moist gas leaving the tar dehydrating and gas condensing shaft for controlling the rate at which wet tar is introduced into the shaft.

13. A method of separating a liquid emulsion into its high and low boiling constituents comprising intimately contacting the emulsion with a uniflow current of gas containing super heat with respect to the vapor of the low boiling constituent of the emulsion for a period of time sufficient to effect selective evaporization of said low boiling constitutent, subsequently separating the gas and vaporized low boiling constituent from the high boiling constituent, and controlling the volume ratios of gas and emulsion thus contacted and the period of contact to maintain the temperature of the separated gas slightly above its dew-point with respect to the vapor of said low boiling constituents.

14. Apparatus for separating an emulsion into its high and low boiling constituents comprising an upright conduit, means for introducing emulsion at the top of said conduit, means for introducing gas containing superheat with respect to the vapor of the low boiling constituent of said emulsion into the top of said conduit, means for causing said gas and emulsion to pass downwardly through said conduit in intimate contact, separate means for removing the high boiling constituents of said emulsion and the gas admixed with the vapors of the low boiling constituent from the base of said conduit, and separate means for controlling the volume ratios of gas and emulsion passed through said conduit and the period of contact of said gas and emulsion in said conduit, at least one of the said means being under the control of devices responsive to the temperature of the admixed gas and vapors of said low boiling constituent leaving the base of said conduit.

15. The method of separating liquid emulsions into their high and low boiling constituents which comprises atomizing a regulated volume of the emulsion into a stream of hot gas containing superheat with respect to the vapor of the low boiling constituent, dispersing the emulsion through the hot gas and passing both downwardly through a dephlegmating shaft in intimate heat transferring relationship to evaporate said low boiling constituent, separately removing the high boiling constituent and the gas and vapors of the low boiling constituent from the base of the shaft, and automatically governing the rate at which the emulsion is introduced into the shaft to maintain the temperature of the gas leaving the base of the shaft above its dew point with respect to said low boiling constituent.

16. The method of dehydrating tar, which comprises bringing tar containing water emulsified therewith into intimate contact with hot coal distillation gases at a temperature not greatly reduced from the maximum temperature of such gases, and so adjusting the amount of tar with respect to the sensible heat in the coal distillation gases contacted therewith that the said heat will effect substantially complete vaporization of the water from the emulsion while maintaining the said gas in an unsaturated condition with respect to moisture at the minimum temperature reached during contact thereof with the tar.

In testimony whereof I affix my signature.
ALFRED JOHNSON.